United States Patent
Kulas (10) Patent No.: US 9,350,841 B2
(45) Date of Patent: May 24, 2016

(54) HANDHELD DEVICE WITH RECONFIGURING TOUCH CONTROLS

(71) Applicant: Charles J. Kulas, San Francisco, CA (US)

(72) Inventor: Charles J. Kulas, San Francisco, CA (US)

( * ) Notice: Subject to any disclaimer, the term of this patent is extended or adjusted under 35 U.S.C. 154(b) by 94 days.

(21) Appl. No.: 14/479,712

(22) Filed: Sep. 8, 2014

(65) Prior Publication Data

US 2014/0380185 A1    Dec. 25, 2014

Related U.S. Application Data

(63) Continuation of application No. 13/492,478, filed on Jun. 8, 2012, now Pat. No. 8,863,042.

(60) Provisional application No. 61/590,284, filed on Jan. 24, 2012.

(51) Int. Cl.

| | | |
|---|---|---|
| *G06F 3/00* | (2006.01) |
| *H04M 1/247* | (2006.01) |
| *G06F 3/041* | (2006.01) |
| *H04M 1/00* | (2006.01) |
| *H04M 1/02* | (2006.01) |
| *G06F 3/042* | (2006.01) |
| *G06F 3/048* | (2013.01) |
| *H04M 1/725* | (2006.01) |
| *G06F 3/0484* | (2013.01) |
| *G06F 3/0488* | (2013.01) |

(52) U.S. Cl.
CPC ............. *H04M 1/2477* (2013.01); *G06F 3/041* (2013.01); *G06F 3/048* (2013.01); *G06F 3/0425* (2013.01); *G06F 3/0484* (2013.01); *G06F 3/0488* (2013.01); *H04M 1/00* (2013.01); *H04M 1/0202* (2013.01); *H04M 1/247* (2013.01); *H04M 1/72569* (2013.01); *H04M 2250/22* (2013.01); *H04M 2250/52* (2013.01)

(58) Field of Classification Search
CPC .... G06F 3/041; G06F 3/0484; H04M 1/2477; H04M 3/03547
USPC ........................... 715/864, 745; 345/173, 633
See application file for complete search history.

(56) References Cited

U.S. PATENT DOCUMENTS

| | | | | |
|---|---|---|---|---|
| 6,519,003 B1 * | 2/2003 | Swayze | .............. | H04N 1/00352 348/333.01 |
| 7,649,522 B2 * | 1/2010 | Chen | ..................... | G06F 3/0383 345/156 |
| 7,932,892 B2 * | 4/2011 | Chen | ..................... | G06F 3/0383 345/156 |
| 8,125,440 B2 * | 2/2012 | Guyot-Sionnest | ...... | G06F 3/014 345/156 |
| 8,144,122 B2 * | 3/2012 | Chen | ..................... | G06F 3/0383 345/156 |
| 8,375,334 B2 * | 2/2013 | Nakano | ................. | G06F 1/1626 715/810 |
| 8,395,584 B2 * | 3/2013 | Griffin | ................. | H04M 1/236 345/169 |

(Continued)

Primary Examiner — William Titcomb (57) ABSTRACT

Embodiments of the invention provide a system for reconfiguring touch controls on a device, such as a cell phone, in reaction to a user's changing mode of operation. For example, a standard display of icons that works well in two-handed operation may not work as well for one-handed operation where the user tries to operate the controls with a thumb of the holding hand. In such a case, a device can detect that the user is trying to operate the controls with a thumb of the holding hand and the controls can be reconfigured to be more suitable for thumb operation. Reconfiguration can also occur in other modes of operation, such as when the user is using a stylus, multiple fingers of a second (non-holding hand), fingers on both hands, etc. In some embodiments, detection of the mode of operation can be automatic such as where a camera takes an image to determine the mode.

3 Claims, 5 Drawing Sheets

(56) References Cited

U.S. PATENT DOCUMENTS

| | | | | |
|---|---|---|---|---|
| 2004/0080487 A1* | 4/2004 | Griffin | G06F 1/1626 | 345/156 |
| 2004/0100479 A1* | 5/2004 | Nakano | G06F 1/1626 | 715/700 |
| 2007/0080934 A1* | 4/2007 | Chen | G06F 3/0383 | 345/156 |
| 2008/0015115 A1* | 1/2008 | Guyot-Sionnest | G06F 3/014 | 506/24 |
| 2009/0167696 A1* | 7/2009 | Griffin | H04M 1/236 | 345/169 |
| 2009/0167727 A1* | 7/2009 | Liu | G06F 3/044 | 345/179 |
| 2010/0013780 A1* | 1/2010 | Ikeda | G06F 3/04883 | 345/173 |
| 2010/0238111 A1* | 9/2010 | Chen | G06F 3/0383 | 345/157 |
| 2010/0271312 A1* | 10/2010 | Alameh | G06F 3/0421 | 345/173 |
| 2011/0169760 A1* | 7/2011 | Largillier | G06F 3/04883 | 345/173 |
| 2011/0199295 A1* | 8/2011 | Chen | G06F 3/0383 | 345/156 |
| 2011/0304550 A1* | 12/2011 | Romera Jolliff | G06F 3/016 | 345/168 |
| 2012/0075229 A1* | 3/2012 | Summers | G06F 3/044 | 345/173 |
| 2012/0162078 A1* | 6/2012 | Ferren | G06F 3/04886 | 345/168 |
| 2012/0202515 A1* | 8/2012 | Hsu | G06Q 10/087 | 455/456.1 |
| 2013/0135228 A1* | 5/2013 | Won | G06F 3/04883 | 345/173 |
| 2013/0147701 A1* | 6/2013 | Cripps | G06F 3/017 | 345/156 |
| 2013/0188081 A1* | 7/2013 | Kulas | G06F 3/041 | 348/333.01 |

* cited by examiner

HANDHELD DEVICE WITH RECONFIGURING TOUCH CONTROLS

CROSS REFERENCES TO RELATED APPLICATIONS

This application is a continuation of the following application, U.S. patent application Ser. No. 13/492,478, entitled HANDHELD DEVICE WITH TOUCH CONTROLS THAT RECONFIGURE IN RESPONSE TO THE WAY A USER OPERATES THE DEVICE, filed on Jun. 8, 2012, which claims priority from U.S. Provisional Patent Application Ser. No. 61/590,284; entitled "USER INTERFACE USING DEVICE AWARENESS", filed on Jan. 24, 2012, which is hereby incorporated by reference as if set forth in full in this document for all purposes.

BACKGROUND

Embodiments of the invention relate generally to handheld electronic devices and more specifically to a touch interface for such a device that reconfigures in response to the way a user operates the device.

Portable handheld computing devices such as cell phones, personal digital assistants (PDAs), audio players, cameras, global positioning satellite (GPS) devices, games, etc., are more commonly using a touch interface. In a touch interface, the user is presented with images of controls such as buttons, icons, links, sliders, bars, boxes, etc. The user is able to manipulate the controls by touching the display screen on which the controls are displayed. Typically a user holds the device in one hand and uses a finger on the other hand to tap or slide a control on the screen. However, often a user may try to operate the device in a different manner, such as one-handed operation where the thumb of the holding hand is used to operate the controls. In such one-handed operation it may be difficult or impossible to operate the controls easily.

SUMMARY

Embodiments of the invention provide a system for changing the location, number, type or other operation of touch controls. For example, a standard display of controls that works well in two-handed operation may not work well for one-handed operation where the user tries to operate the controls with a thumb of the holding hand. In such a case, a device can detect that the user is trying to operate the controls with a thumb of the holding hand and the controls are reconfigured to be more suitable for thumb operation. Reconfiguration can also occur in other modes of operation, such as when the user is using a stylus, multiple fingers of a second (non-holding hand), fingers on both hands, etc. In some embodiments, detection of the mode of operation can be automatic such as where a camera takes an image to determine the mode. Or the user can change modes manually with a control or by voice, touch, gesture, device movement or other commands.

In one embodiment a method for reconfiguring controls shown on a touch screen display is disclosed. The touch screen display is included in a device, wherein the reconfiguring allows one or more of the controls to be more accessible for operation of a thumb of a hand holding the device. The method includes displaying at least one control in a first position on the touch screen display; accepting a signal to indicate that reconfiguring for a thumb mode of operation is desired; and changing the display in response to the signal so that the at least one control is moved to a thumb access area, wherein the at least one control is more accessible for operation by the thumb than when the at least one control was in the first position.

Another embodiment provides a method for reconfiguring controls shown on a touch screen display, wherein the touch screen display is included in a device, wherein the reconfiguring allows one or more of the controls to be more adapted for use with a stylus, the method comprising: displaying at least one control in a first position on the touch screen display; accepting a signal to indicate that reconfiguring for a stylus mode of operation is desired; and changing the display in response to the signal so that the at least one control is adapted for the stylus mode.

DETAILED DESCRIPTION OF EMBODIMENTS

FIGS. 1-7 are first discussed to establish a basic understanding of operating a device's touch screen with a thumb of a holding hand.

Figure 1:
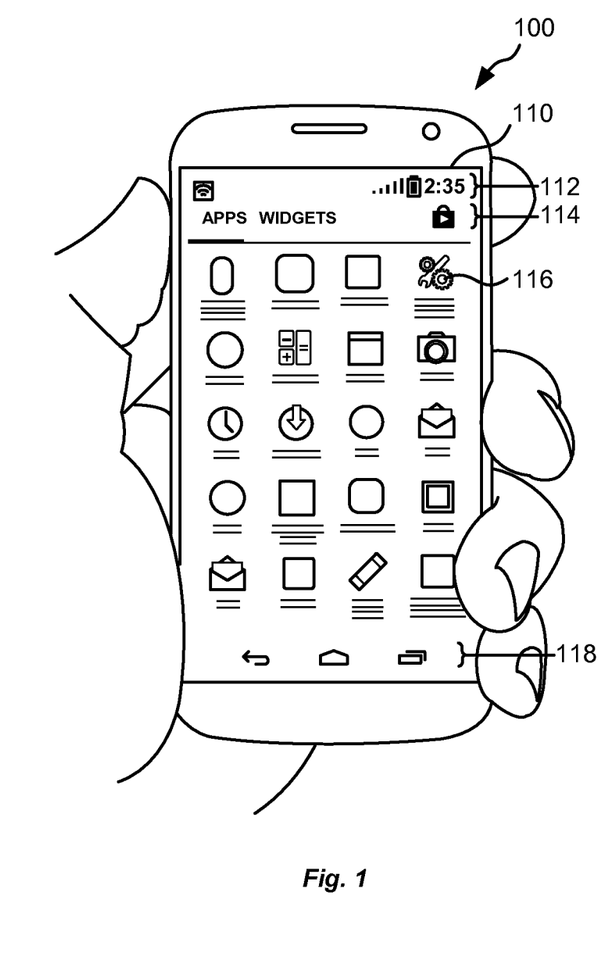
FIG. 1 is a first illustration of a thumb mode of operation.

FIG. 1 shows a typical cell phone held in the left hand. Cell phone 100 includes a touch screen that occupies substantially all of the front face of the device. Various controls are displayed on the touch screen such as icon 116 which can be pressed to launch an application corresponding to the icon. In FIG. 1, 20 icons are displayed in a grid of 5 rows by 4 columns. The navigation controls above the icon grid at 114 include the words "APPS" and "WIDGETS." These words are actually button controls along with the icon in the same row to the right. The topmost controls above the navigation controls at 112 show the well-known icons of wireless connectivity, cell signal strength, battery charge level and time. The topmost control bar can be swiped down to reveal more control options. Finally, system buttons at 118 include "BACK," "HOME" and "TASK SWITCHER." Other control features may be present such as allowing the user to swipe left or right across the icon grid to move to a new page, or new set, of icons.

Although specific controls are shown and discussed herein, it should be apparent that any number, type and arrangement of controls can be used in different situations. The specific details of the provided Figures are intended to provide examples to illustrate features of various embodiments of the invention. Features which may be used in any other suitable devices and interfaces.

Figure 2:
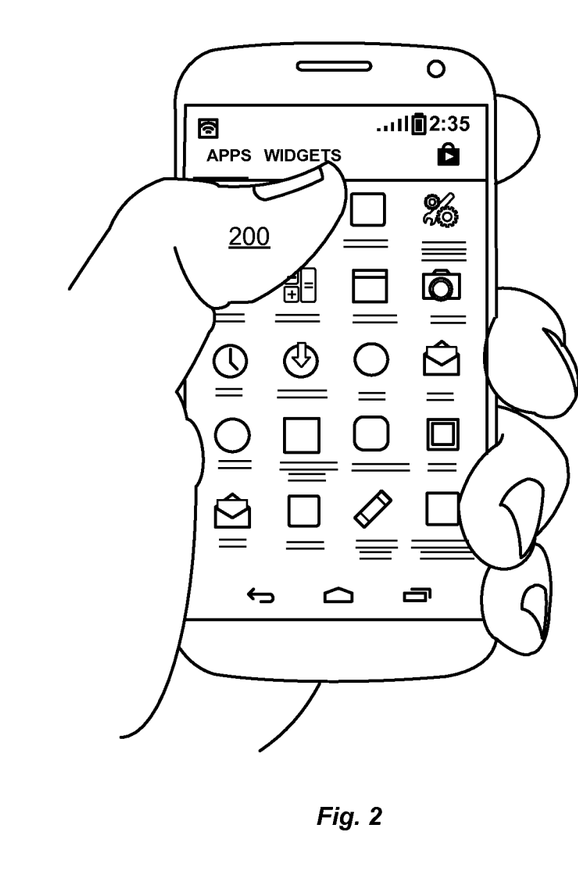
FIG. 2 is a second illustration of a thumb mode of operation.

It should be apparent that by using the index finger, or other finger, of the user's other hand—in this case the right hand (not shown)—it would be a simple matter to press, swipe or otherwise activate or manipulate any of the controls on the touch screen of FIG. 1. However, FIG. 2 shows an example of the user using thumb 200 of the holding hand—in this case the left hand—to activate controls on the touch screen. Although a particular hand may be discussed it should be apparent that much of the discussion can apply to the symmetrical situation in which the hands are switched. In FIG. 2, the thumb is attempting to tap on icon 1-2, that is, the icon in row 1, column 2. This icon is at the top row and second from the left. Note that while accessing icon 1-2 is possible, it is generally not as easy as using the index finger of right hand. Also, the part of the thumb that is contacting the touch screen is not the tip of the thumb but actually the left side of the thumb which can cause the user's press to be less accurate or precise.

Figure 3:
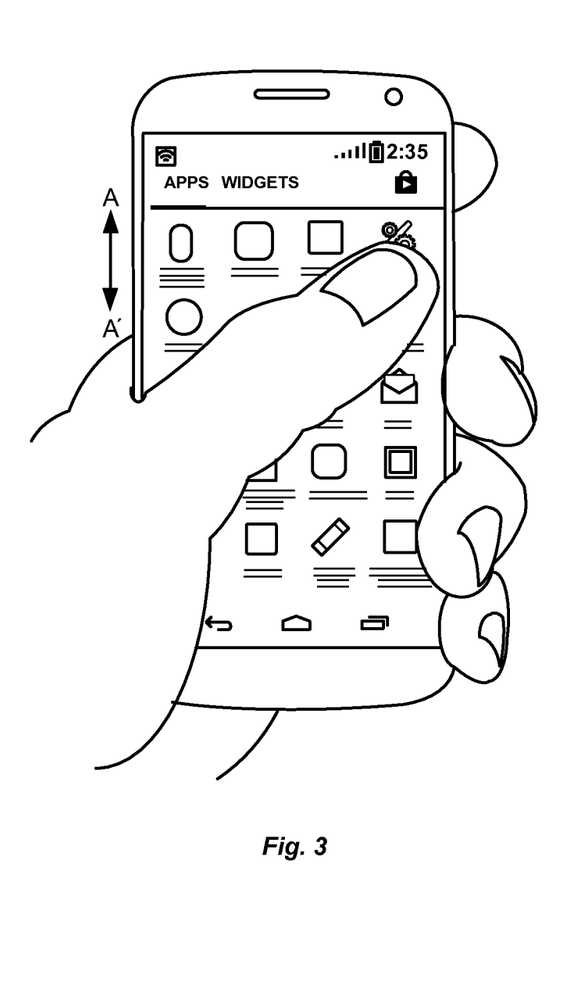
FIG. 3 is a third illustration of a thumb mode of operation.

FIG. 3 shows the thumb extending to reach icon 1-4. Although icon 1-4 is just reachable in FIG. 3, this may not always be the case depending on the size of the device, layout of icons, size of the user's hand and thumb, etc. Also, the vertical position of the phone with respect to the user's holding hand (i.e., along the direction A-A') plays an important role in the ability of the thumb to access different parts of the touch screen effectively. Various embodiments of the invention that take these factors into consideration are discussed in more detail below.

Figure 4:
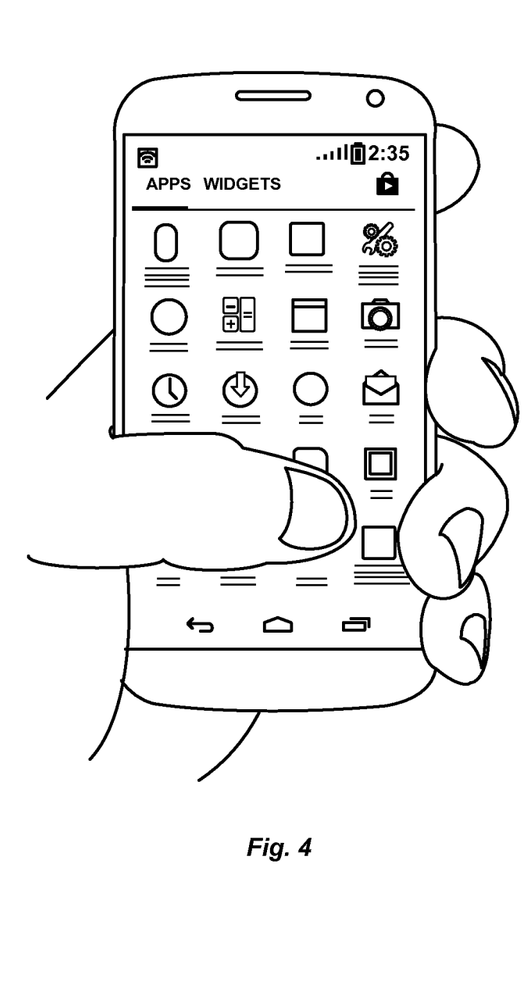
FIG. 4 is a fourth illustration of a thumb mode of operation.

FIG. 4 shows the thumb pressing icon 4-3. This is a fairly easy access for the device and hand size and position shown in FIG. 4. Note that in this position the thumb is able to press with more of the tip than the side in contrast to the case of FIG. 2.

Figure 5:
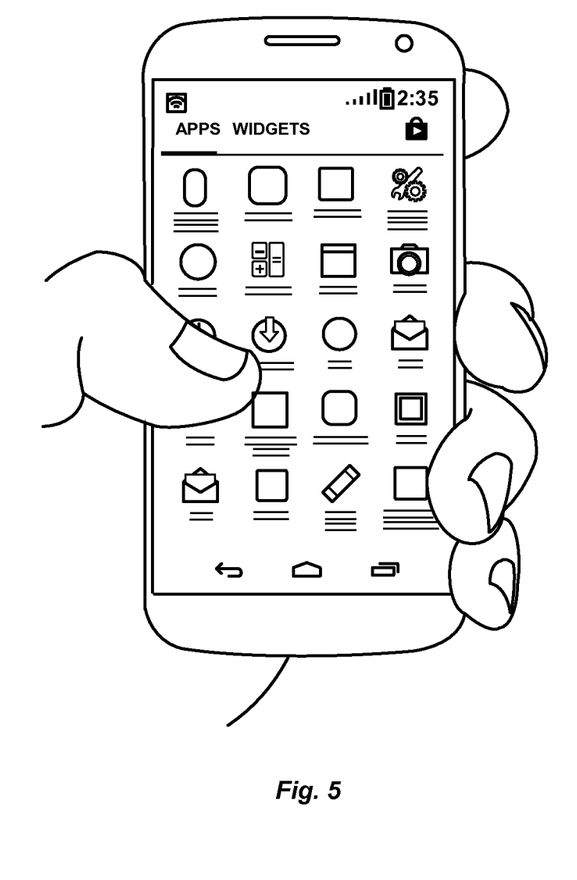
FIG. 5 is a fifth illustration of a thumb mode of operation.
Figure 6:
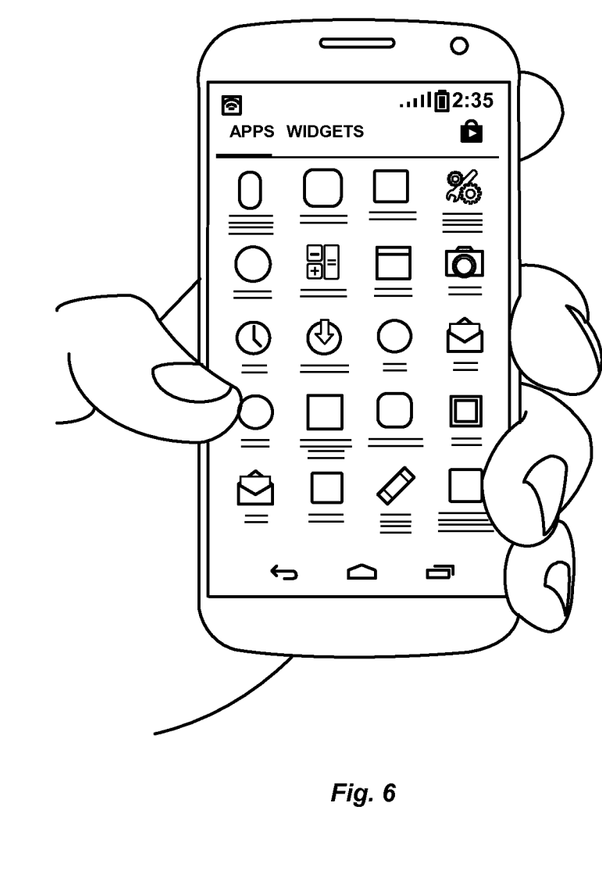
FIG. 6 is a sixth illustration of a thumb mode of operation.

In FIG. 5, the thumb attempts to press icon 4-1. This is a difficult movement and even if the thumb can make the press, the part of the thumb that contacts the touch screen is a rather large area that extends along the entire side of the thumb from the first knuckle to the tip. There are ways to improve the thumb's range and reduce the contact area such as by loosening the grip and sliding the palm of the hand away from the phone as shown in FIG. 6, however, this makes for an unstable grip and is still an awkward pressing movement with the thumb.

Figure 7:
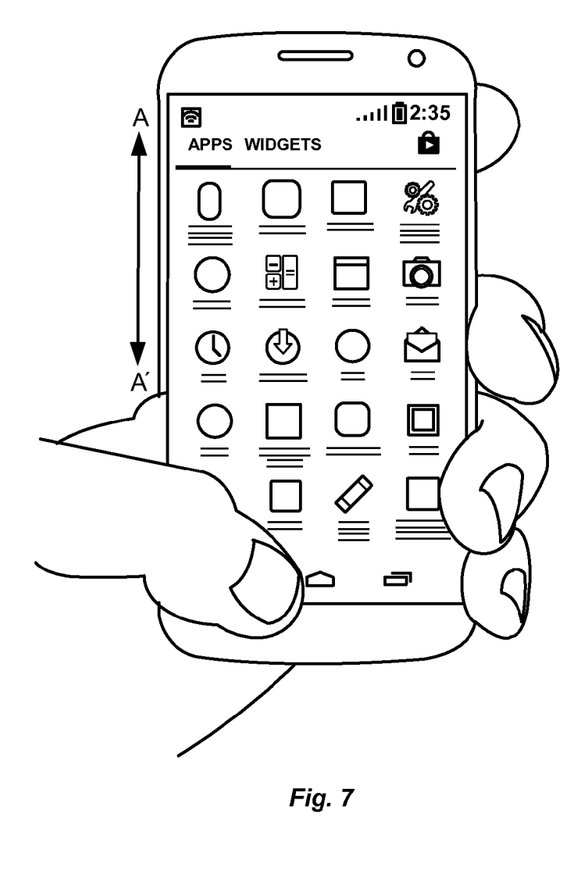
FIG. 7 is a seventh illustration of a thumb mode of operation.

Finally, FIG. 7 shows the thumb pressing the HOME system control button. In order to do this, the grip had to be changed to slide the hand down in the direction A-A'. The little finger is placed underneath the bottom of the phone for stability. Such re-positioning movements are often necessary when using the thumb of the holding hand to operate the device but can be awkward, uncomfortable and time-consuming.

Figure 8:
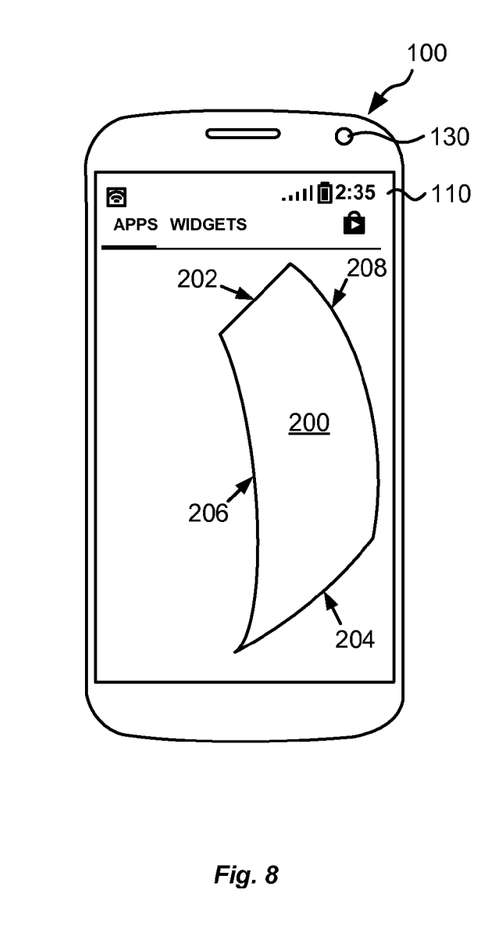
FIG. 8 shows a thumb access area for an exemplary thumb on an exemplary device.

FIG. 8 shows thumb access area 200 for an exemplary thumb on an exemplary device. Although access area 200 is defined with visible boundaries, it should be apparent that these are not hard boundaries but merely loosely define the workable or efficient area in which the thumb can act to more easily press, swipe or otherwise operate a control. The size, shape and definition of the optimal access area can vary depending on factors such as user hand size; skeletal and muscular shape, strength and other properties; size of the device, type of controls, user preferences, etc. In general, for thumb operation, the access area has a retracted curve 206 which is the curve traced along a line easily contacted by the thumb by moving the thumb from top 202 to bottom 204 while the thumb is retracted. Extended curve 208 is a similar curve traced while the thumb is extended. Top 202 and bottom 204 are defined as the limits of top and bottom swing of the thumb while still allowing the thumb to make an effective, controlled and accurate press or contact with the touch screen. In general, a thumb access area is an area on a touch screen in which thumb pressing by the holding hand is improved over areas outside of the access area.

In general, in a standard or two-handed mode of operation the entire touch screen area may be used for controls similar to what is shown in FIGS. 1-7. In a one-handed mode of operation, one or more of the controls may be moved to or toward the access area in order to allow better operation of the control by a thumb of the user.

Figure 9:
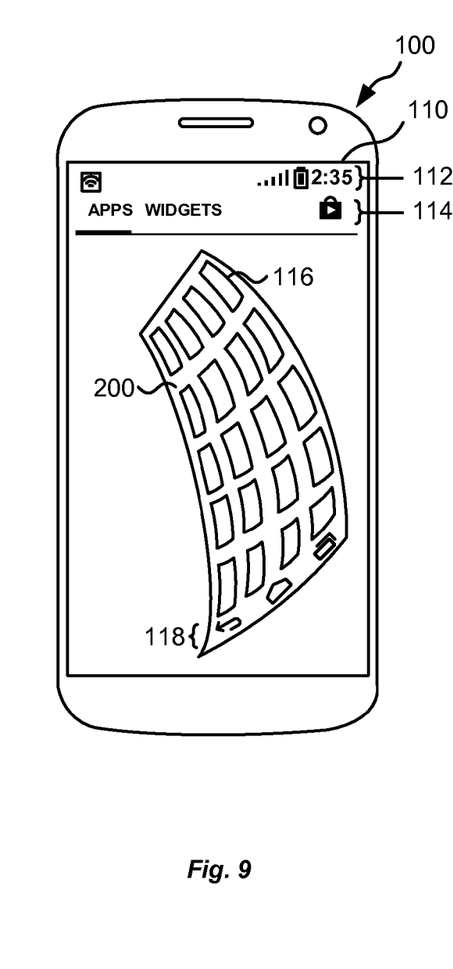
FIG. 9 shows a particular embodiment where icons and system controls of FIG. 1 have been relocated to an access area.

FIG. 9 shows a particular embodiment where the icons and system controls of FIG. 1 have been relocated to access area 200. Icon 106, for example, is in the upper right of the access area that corresponds to the upper-right of the icon grid of FIG. 1. Note that other controls in the standard configuration are not moved such as the controls at 112 and 114, discussed previously.

The access area can be automatically defined by the device such as by having a default access area. The device can also request that the user trace an access area and use the resulting trace. The device can also use the front-facing camera 130 to image the movements of the thumb and generate the access area by observation. In one embodiment, the interface can be automatically switched from a standard mode (e.g., default or two-handed mode) of control arrangement to the one-handed mode (i.e., thumb mode) of control arrangement upon the device detecting one-handed operation by using the front-facing camera 130. For example, if a thumb is detected by the camera then the user interface is switched to thumb mode. If it is determined that an index finger is approaching the screen then the screen can be switched back to two-handed mode. Such switching may be delayed to take place after the first activation of a control so that the user does not try to press a control only to see the control move away to a different location on the screen.

A user can be allowed to change the shape of the access area. Different patterns for the access area can be provided and the user can select from among them. Updates to the access area shape can be by system or application updates performed by the manufacturer of the device, operating system or another entity. Access patterns can be transferred to or from other devices or users. Other ways to define, estimate or manipulate the access area are possible.

Similar to thumb pressing, thumb swipe sensing can be modified so that the thumb is not required to make movements that might be too awkward. For example, given the curved, arcuate nature of the retracted curve 206 and extended curve 208 (see FIG. 8) it may be beneficial to allow a curve similar to that of 206 and/or 208 rather than require a vertical line swipe as is often needed for a two-handed (non-thumb) mode. Likewise, rather than require a horizontal swipe, as in the two-handed mode, the device can allow an angled swipe with the left thumb similar to what is shown for the top and bottom thumb access area boundaries 202 and 204 of FIG. 8.

A similar approach can be taken to reconfigure one or more controls on the touch screen when it is determined that a user wants to use the device in a stylus mode. A stylus, such as a pen or other pen-like device, can allow a user to point to, touch, activate or otherwise manipulate smaller controls, such as smaller icons, than the user would be able to efficiently use with their fingertip, thumb or other digit of their hand. In a stylus mode, the icons can be made smaller and/or placed closer together. The stylus mode can be entered automatically such as by using the camera to capture and analyze an image to determine how the user is trying to use the device. Or the stylus mode can be entered automatically by accepting a signal from a user control such as a button or other on-screen control, or a physical button, slider, etc. on the device. Or by using voice command, gesture or other type of user input.

Figure 10:
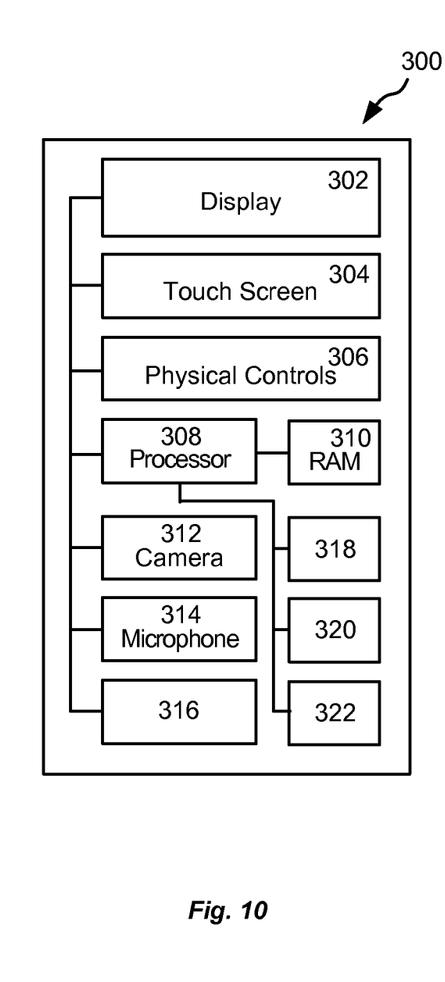
FIG. 10 illustrates basic hardware that can be suitable for use with embodiments disclosed herein

FIG. 10 shows basic hardware that can be suitable for use with functions and embodiments disclosed herein. Although specific hardware components are presented, many suitable types and configuration of components are possible. FIG. 10 merely illustrates an example of a generalized system. Subsystems or components may be added, omitted or changed from those shown in FIG. 10. Any suitable implementation of the functionality attributed to the components shown can be used.

In FIG. 10, device 300 can be a cell phone or other handheld or portable device. Display 302 can be a liquid crystal display (LCD), light-emitting diode (LED), organic LED (OLED), active matrix OLED (AMOLED), plasma, cathode ray tube (CRT), or any other suitable type of display. Touch screen 304 is typically integrated with or adjacent to the surface of display 302 so that when a user touches the screen the touching is sensed and translated into a control operation or command. Touch screen 304 can be implemented by any suitable technology such as resistive, capacitive, infrared, optical imaging, surface acoustic wave, etc.

Physical controls 306 include any tactile dedicated buttons such as a volume rocker, power on/off switch, home button, etc., that may be provided on the device. Processor 308 represents any type of processor configuration including electrical, optical, quantum, chemical, biological, micro-electromechanical systems (MEMS), etc. One or more processors may be used to achieve the functionality describe herein. Although specific interconnections are shown in FIG. 10, any suitable type of connections or communication links between components or subsystems are possible.

Random Access Memory (RAM) 310 includes instructions that are executable by processor 308 to achieve the functions described herein. In general, RAM 310 can be any type of processor-readable storage device such as electronic, electromagnetic, optical, etc. Camera 312 includes optical, infrared; still or video, or other types of cameras that may be provided in a device. As discussed above, the inclusion of a camera can make it possible to automatically determine how the user is trying to use the device so that mode switching and control reconfiguration can be automatic. Image data captured by camera 312 is transferred to processor 308 for analysis. Processor 308 can determine, for example, whether a user is trying to operate on-screen controls with an index finger, thumb, stylus or other object.

Camera 312 can be used to detect gesture commands. Microphone 314 can be used to receive voice commands. Other components and/or subsystems shown as 316, 318, 320 and 322 can be used for other purposes such as to output audio, communicate with other devices, store information, etc.

Although embodiments of the invention have been described with respect to particular embodiments thereof, these particular embodiments are merely illustrative, and not restrictive. Details, including camera detection of user operations, can be found in documents incorporated by reference at the beginning of this specification.

Larger devices that may be adaptable for use with features described herein even though the devices may be considered too large for easy "handheld" or "portable" operation. For example, tablet or slate computers such as the iPad™ by Apple Computer, Inc. can be used even though these devices are significantly larger than cell phones.

Any suitable programming language can be used to implement the routines of particular embodiments including C, C++, Java, assembly language, etc. Different programming techniques can be employed such as procedural or object oriented, scripts, interpreted or compiled code, etc. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method for reconfiguring controls shown on a touch screen display, wherein the touch screen display is included in a device, wherein the reconfiguring allows one or more of the controls to be more accessible for operation of a thumb of a hand holding the device, the method comprising:
   displaying a plurality of controls on the touch screen display;
   accepting a signal to indicate that reconfiguring for a thumb mode of operation is desired; and
   changing the display in response to the signal so that at least one of the plurality of controls is moved to a thumb access area and wherein at least one other control of the plurality of controls is not moved, wherein the at least one control is more accessible for operation by the thumb than when the at least one control was not in the thumb access area.

2. The method of claim 1, wherein the thumb access area is substantially defined by an area on the touch screen display that is easily contacted by the thumb and includes top and bottom edges, a retracted curve edge nearer to the thumb and an extended curve edge farther from the thumb.

3. A method for reconfiguring controls shown on a touch screen display, wherein the touch screen display is included in a device, wherein the reconfiguring allows one or more of the controls to be more accessible for operation of a thumb of a hand holding the device, the method comprising:
- displaying a plurality of controls on the touch screen display;
- displaying at least one graphic on the touch screen display;
- accepting a signal to indicate that reconfiguring for a thumb mode of operation is desired; and
- changing the display in response to the signal so that at least one of the plurality of controls is moved to a thumb access area and wherein the graphic is not moved, wherein the at least one control is more accessible for operation by the thumb than when the at least one control was not in the thumb access area.

* * * * *